Feb. 8, 1927.  
J. A. GUYER ET AL  
RECOVERY OF CHLORINE  
Filed April 19, 1926  
1,617,305
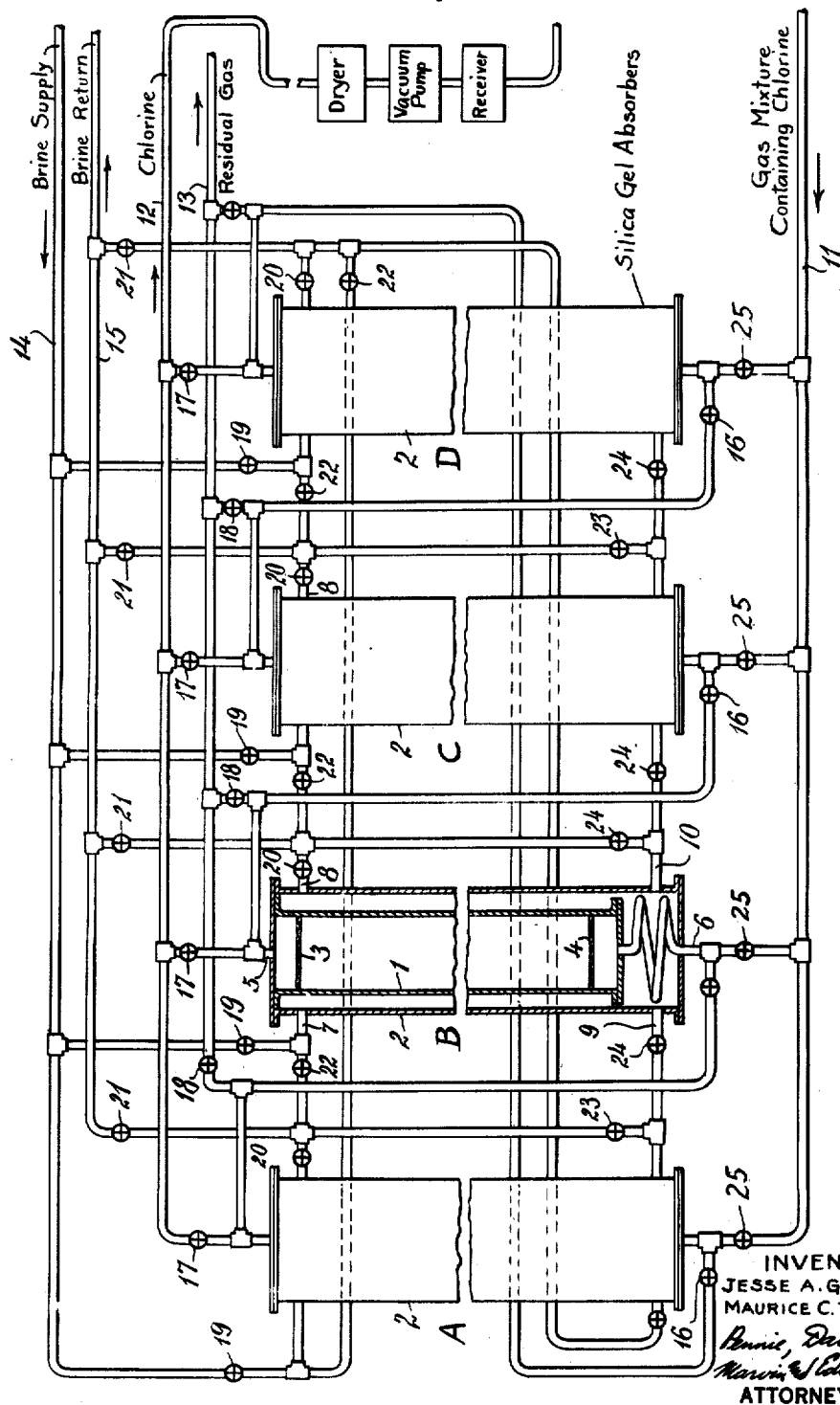
INVENTOR  
JESSE A. GUYER &  
MAURICE C. TAYLOR  
ATTORNEY.

Patented Feb. 8, 1927.

1,617,305

UNITED STATES PATENT OFFICE.

JESSE A. GUYER, OF LA SALLE, AND MAURICE C. TAYLOR, OF NIAGARA FALLS, NEW YORK, ASSIGNORS TO THE MATHIESON ALKALI WORKS, INC., OF NEW YORK, N. Y., A CORPORATION OF VIRGINIA.

RECOVERY OF CHLORINE.

Application filed April 19, 1926. Serial No. 102,881.

This invention relates to improvements in the separation and recovery of chlorine from gas mixtures such as the residual gases, or so-called "blow-off" gases, produced in the manufacture of liquid chlorine by compression and liquefaction methods. In the manufacture of liquid chlorine, chlorine gas, produced for example by the electrolysis of alkali chloride brines, is commonly dried, for example with sulphuric acid, then mechanically compressed, and then cooled with liquefaction of the greater part of the chlorine and separation of the residual or "blow-off" gases. This invention relates particularly to improvements in the utilization of silica gel for the separation and recovery of chlorine from such gas mixtures.

These residual gases are composed principally of air, hydrogen and chlorine, the chlorine commonly being present in amounts approximating 50% by volume. The chlorine content of such gas mixtures is commonly recovered by using the gases to chlorinate alkaline liquors such as solutions or suspensions of sodium hydroxide or calcium hydroxide, or to chlorinate lime for the production of bleaching powder, but for the purposes of manufacturing liquid chlorine it is desirable to recover this chlorine directly when it can be so recovered economically.

The chlorine content of such gas mixtures can be separated by adsorption on various solid absorbent mediums, but several difficulties are involved in the practical utilization of such methods, and they have not heretofore come into commercial use in liquid chlorine plants. To refer to two solid absorbents that have been suggested, namely, activated carbon and silica gel, highly activated carbon catalyzes the reaction between chlorine and hydrogen resulting in the formation of hydrochloric acid which is objectionable, while less active carbon has an absorptive capacity so low as to require the use of excessive amounts of the absorbent, and the thermal conductivity of silica gel is so low that with gas mixtures containing such a high proportion of the component to be adsorbed the ratio between the period when the gel is capable of usefully adsorbing chlorine and the period necessary to separate the adsorbed chlorine from the gel and bring the gel back to its original condition with usual methods is inordinately small. From the practical standpoint, this disadvantage is particularly marked where it is necessary to handle fairly large amounts of the gas mixture.

Under certain conditions, however, chlorine can be separated from such gas mixtures by adsorption on silica gel and recovered directly from the silica gel, and this invention provides a special method of using silica gel in the separation and recovery of chlorine from such gas mixtures which makes it possible to effect the recovery economically and efficiently in a manner adapted to practical purposes, even where the gas mixture contains a large proportion of chlorine and where it is necessary to handle large amounts of the gas mixture. The present invention relates particularly to improvements in the utilization of silica gel for the separation and recovery of chlorine from gas mixtures containing chlorine.

The complete process comprises production of chlorine gas, for example by electrolytic methods; drying of the chlorine gas; compression of the chlorine gas in mechanical compressors; cooling of the compressed gas and liquefaction of the greater part of the chlorine; separation of the residual gas; removal of chlorine from the residual gas by adsorption on silica gel; separation of adsorbed chlorine from the silica gel; and liquefaction of the concentrated chlorine so obtained, for example by cyclically returning it to the mechanical compressors. This invention relates particularly to improvements in the steps of adsorption of the chlorine on silica gel and the separation of adsorbed chlorine from the silica gel.

According to the present invention, the gas mixture containing chlorine is subjected to treatment with silica gel under a pressure advantageously superatmospheric and the adsorbed chlorine is separated from the silica gel under a lower pressure while the temperature is maintained low enough to provide a useful margin in content of chlorine adsorbed on the silica gel over the pressure differential used. The pressure maintained during separation of the adsorbed chlorine from the silica gel may advantageously be much lower than atmospheric pressure. The temperature maintained during the operation may advantageously be much lower than ordinary atmospheric temperatures, refrigeration being employed with advantage. The cycle of the special process of the invention comprises adsorption of chlorine on the silica gel during which period the temperature of the silica gel tends to rise due to the heat of adsorption, followed by separation of adsorbed chlorine by a reduction of pressure during which period the temperature of the silica gel tends to drop due to the heat absorbed in vaporization of the chlorine.

The adsorptive capacity of silica gel for chlorine decreases with increasing temperature and the heat of adsorption of chlorine on silica gel is substantial. In the usual applications of silica gel, the component of the gas mixture to be adsorbed is present in but small amount so that the balance of the gas mixture is available to absorb in substantial measure the heat of adsorption. With gas mixtures containing a high proportion of chlorine, such as those to which this invention particularly relates, however, the remainder of the gas mixture is necessarily much less effective in absorbing the heat of adsorption while the chlorine has a comparatively high heat of adsorption. Due to its low thermal conductivity, moreover, silica gel cannot be efficiently cooled by any ordinary external cooling means. As a result the adsorptive capacity of the silica gel is limited by the temperature rise due to the heat of adsorption as well as by the actual quantity of chlorine adsorbed. In carrying out this invention, the heat of adsorption is removed from the silica gel, in large part, by the vaporization of the adsorbed chlorine which is carried out under reduced pressure, under which conditions the low thermal conductivity of the silica gel becomes unimportant, and difficulties that might be due to the temperature rise during the adsorption period are avoided by making the cycle of operations short. When artificial cooling or refrigeration is employed in carrying out the invention, it is advantageously used to reduce the temperature range over which the entire cycle of operations is carried out rather than to maintain an additional temperature differential in order to eliminate as far as possible any inefficiencies due to the low thermal conductivity of the silica gel. That is, it is usually more advantageous to maintain artificial cooling substantially throughout the operation rather than only through parts of the cycle as the latter scheme of operation requires some heat transfer through the silica gel if the artificial cooling is to be entirely effective, particularly where the period of the cycle is short. In carrying out the present invention, the separation of adsorbed chlorine from the silica gel is effected primarily by pressure reduction, promoting high capacity per pound of silica gel per hour with respect to chlorine.

The invention will be further described, and in more detail, in connection with specific operations in accordance with the invention, and in this further description reference will be made to the accompanying drawings which illustrate in a diagrammatic and conventional manner apparatus adapted for carrying out the process of the invention. In the accompanying drawings, the absorbers are all of similar construction, the interior construction being shown in absorber B which is shown in section.

Referring to the apparatus shown in the drawings, each absorber comprises an inner receptacle 1, which may for example have an inside diameter of about 24" and a length of about 12', enclosed within another receptacle 2 in the nature of a jacket. Retaining screens, 3 and 4, are arranged at the ends of the inner receptacle, and the silica gel is supported between them. In an absorber of the dimensions just mentioned, about 1500 pounds of silica gel may be used. A connection 5 and a connection 6 communicate with the upper and lower end, respectively, of the inner receptacle. Connections 7, 8, 9 and 10 communicate with the space within the jacket about the inner receptacle. The entire absorber may with advantage be thermally insulated or lagged. As it passes through the lower part of the outer receptacle 2, the connection 6 is arranged to provide a somewhat extended heat transferring surface at this point. A connection 11 is arranged for supplying the gas mixture containing chlorine to the series of absorbers, connections 12 and 13, respectively, are arranged for withdrawing concentrated chlorine and stripped residual gas from the absorbers, and connections 14 and 15 are arranged for circulating cooling brine through the absorbers. The connection 11 may communicate directly with the blow-off for residual gas from a compressor plant for the liquefaction of chlorine. The concentrated chlorine connection 12 is advantageously arranged to communicate with a vacuum pump and a receiver for the chlorine through suitable drying apparatus, for example apparatus for drying the chlorine by treating it with sulphuric acid.

As the valves are arranged in the same way for each absorber, they will be specifically described in connection with but one of the absorbers, and it will be understood that the valve on any one of the absorbers can be designated by the reference numeral for that valve as specifically described with the reference letter for the particular absorber appended. Valves 25 are arranged to permit any one of the absorbers to be connected to the supply line for the gas mixture containing chlorine. Valves 16 are arranged to permit the gas mixture escaping from an adjacent absorber through connection 5 to be led through the next absorber. Valves 17 are arranged to permit any one of the absorbers to be connected to the line for withdrawal of concentrated chlorine. Valves 18 are arranged to permit any one of the absorbers to be connected to the line for discharge of stripped residual gases. Valves 19 are arranged to permit cool brine to be supplied to the jackets about any of the absorbers. Valves 20 are arranged to permit brine to be passed from the jacket of one absorber either to the brine return line through valves 21, or to the upper end of the adjacent absorber through valves 22, or to the lower end of the adjacent absorber through valves 23 and 24. Brine may also be passed from the lower end of one absorber to the upper end of the adjacent absorber through valves 23 and 22.

From the foregoing it will be apparent that the absorbers are arranged to be operated in series and that each absorber can be progressively moved through the series by properly adjusting the several valves. In carrying out the invention, it is advantageous to pass the gas mixture containing chlorine to be absorbed through three of the absorbers in series while a fourth, the absorber last handling the most concentrated gas mixture, is connected to the vacuum pump or otherwise being operated for the removal of adsorbed chlorine. For example, by opening valve 25 and closing valves 16, 17 and 18 on absorber A and by opening valves 16 and closing valves 25 and 17 on absorbers B and C and by closing valve 18 on absorber B and opening valve 18 on absorber C the gas mixture containing chlorine is passed successively through absorbers A, B and C from the supply line 11 to the residual gas discharge line 13; while at the same time by closing valves 25, 16 and 18 on absorber D and opening valve 17 on this absorber, the adsorbed chlorine is withdrawn from absorber D through the concentrated chlorine line 12. When the absorber D is discharged so far as practicable and the absorber A fully charged, valve 17 for absorber D is closed and valves 16 for absorber D and 18 for absorber D are opened, valve 18 for absorber C is closed, valve 16 for absorber B is closed, valve 25 for absorber A is closed and valve 25 for absorber B is opened and valve 17 for absorber A is opened so that the gas mixture containing chlorine is then passed successively through absorbers B, C and D while the absorber A is being discharged. When the absorber A is discharged and the absorber B fully charged, the operation is repeated in the same manner so that the gas mixture is passed successively through absorbers C, D and A while the absorber B is being discharged, and so on.

The cooling brine may be circulated through the jackets of all of the absorbers in parallel, or it may be circulated through them in series. One way of circulating the brine through the absorbers in series is to circulate it first through the absorber through which the most concentrated chlorine-containing gas mixture is passing, then through the absorbers through which the gas mixture next passes in generally concurrent flow and finally through the absorber which is being discharged. The brine can also be circulated through the absorbers through which the chlorine-containing gas mixture is passing in generally counter-concurrent flow and finally through the absorber which is being discharged.

In one way of carrying out the process of the invention in the apparatus illustrated, sufficient artificial cooling is used so that the initial temperature of the silica gel as the chlorine-containing gas mixture is first passed through it is about 0° C. and the adsorption is carried out under a pressure of about 12 atmospheres absolute while the silica gel is discharged under a pressure of about 1 atmosphere absolute. Under these conditions, about 16 pounds of chlorine per pound of silica gel can be recovered per cycle from a gas mixture containing about 50% by volume of chlorine in admixture with air and hydrogen. An apparatus containing about 1500 pounds of silica gel per absorber operated on this basis with the period of the cycle about one hour would thus have an hourly capacity upwards of 350 pounds of chlorine.

In another way of carrying out the process of the invention, sufficient artificial cooling is used so that the initial temperature of the silica gel as the chlorine-containing gas mixture is first passed through it is about −30° C. and the adsorption is carried out under a pressure of about 3 atmospheres absolute while the silica gel is discharged under a pressure of about ⅙ atmosphere absolute, that is about 2.45 pounds per square inch absolute pressure. Under these conditions, about .15 pounds of chlorine per pound of silica gel can be recovered per cycle from a gas mixture containing air and hydrogen with about 50% by volume of chlorine. An apparatus containing about 1500 pounds of silica gel per absorber operated on this basis with the period of the cycle about one hour would thus have an hourly capacity upwards of 200 pounds of chlorine. This hourly capacity can be increased by decreasing the period of the cycle somewhat, in which event it may be desirable to add one or more additional absorbers to the series. As it is common in practical operations to discharge the "blow-off" gases from a compressor plant for the liquefaction of chlorine at pressures approximating three atmospheres absolute, this latter type of operation has several special advantages for use in conjunction with such operations. An additional compressor for the chlorine-containing gas mixture becomes unnecessary as the "blow-off" gases are under sufficient pressure to be supplied directly to the absorbers. High pressures which are sometimes dangerous in handling mixtures containing chlorine, air and hydrogen are also avoided.

In the foregoing examples it will be understood that the temperature of the silica gel increases during the adsorption part of the cycle and that it is not essential to attempt to maintain it at the initial temperature during the entire operation. In the last described operation, for example, the temperature of the silica gel may rise to as much as —6° C. or more. Likewise it will be understood that the preponderance of the cooling of the gel is effected by vaporization of the adsorbed chlorine during the discharge part of the cycle, and that artificial cooling is employed to maintain the temperature range of the operation within the desired upper limit. Artificial cooling is not always essential although it is usually advantageous, for example the pressure differential used may be wide enough to give a good recovery per cycle without artificial cooling although artificial cooling would increase the recovery. The initial temperature of the silica gel may be as high as 10° C. or higher, but it is advantageous to keep it below this value. The pressures employed during adsorption may be higher than those specifically mentioned, and the pressures used during discharge of the adsorbed chlorine from the silica gel may be lower than those specifically mentioned, pressures as low as ½ pound per square inch absolute pressure or lower being useful in carrying out the invention.

This invention relates particularly to the utilization of silica gel in the recovery of chlorine from gas mixtures containing the chlorine in high concentration, say upwards of about 20% by volume, and it is particularly in connection with the treatment of such gas mixtures containing a high proportion of chlorine that many of the advantages of the invention are realized. In some aspects, however, the invention is of more general application and has advantages of more general application. In referring herein to ordinary atmospheric temperatures, reference is made to temperatures in the neighborhood of 10° to 20° C.

We claim:

1. An improved method of recovering chlorine from gas mixtures containing the same by adsorption on silica gel which comprises subjecting the chlorine-containing gas mixture to treatment with silica gel at an initial temperature not higher than about 0° C.

2. An improved method of recovering chlorine from gas mixtures containing the same by adsorption on silica gel which comprises subjecting the chlorine-containing gas mixture to treatment with silica gel at an initial temperature not higher than about 10° C.

3. An improved method of recovering chlorine from gas mixtures containing the same by adsorption on silica gel which comprises subjecting the chlorine-containing gas mixture to treatment with silica gel at an initial temperature not higher than about 0° C. and thereafter separating adsorbed chlorine from the silica gel by maintaining the silica gel under a lower pressure than that prevailing during the adsorption treatment.

4. An improved method of recovering chlorine from gas mixtures containing not less than about 20% of chlorine by volume which comprises subjecting the chlorine-containing gas mixture to treatment with silica gel and thereafter separating adsorbed chlorine from the silica gel by maintaining the silica gel under a lower pressure than that prevailing during the adsorption treatment.

5. An improved method of recovering chlorine from gas mixtures containing not less than about 20% of chlorine by volume which comprises subjecting the chlorine-containing gas mixture to treatment with silica gel and thereafter separating adsorbed chlorine from the silica gel by maintaining the silica gel under a lower pressure than that prevailing during the adsorption treatment and artificially cooling the silica gel during the operation.

6. An improved method of recovering chlorine from gas mixtures containing not less than about 20% of chlorine by volume which comprises subjecting the chlorine-containing gas mixture to treatment with silica gel under superatmospheric pressure and thereafter subjecting the silica gel and adsorbed chlorine to subatmospheric pressure to liberate adsorbed chlorine therefrom.

7. An improved method of recovering chlorine from gas mixtures containing not less than about 20% of chlorine by volume which comprises subjecting the chlorine-containing gas mixture to treatment with silica gel at an initial temperature not higher than about 0° C. and thereafter separating adsorbed chlorine from the silica gel by maintaining the silica gel under a lower pressure than that prevailing during the adsorption treatment.

8. An improved method of recovering chlorine from gas mixtures containing about 50% of chlorine by volume which comprises subjecting the chlorine-containing gas mixture to treatment with silica gel and thereafter separating adsorbed chlorine from the silica gel by maintaining the silica gel under a lower pressure than that prevailing during the adsorption treatment.

9. An improved method of recovering chlorine from gas mixtures containing about 50% of chlorine by volume which comprises subjecting the chlorine-containing gas mixture to treatment with silica gel under superatmospheric pressure and thereafter subjecting the silica gel and adsorbed chlorine to subatmospheric pressure to liberate adsorbed chlorine from the silica gel.

In testimony whereof I affix my signature.

JESSE A. GUYER.

In testimony whereof I affix my signature.

MAURICE C. TAYLOR.

subjecting the chlorine-containing gas mixture to treatment with silica gel and thereafter separating adsorbed chlorine from the silica gel by maintaining the silica gel under a lower pressure than that prevailing during the adsorption treatment.

9. An improved method of recovering chlorine from gas mixtures containing about 50% of chlorine by volume which comprises subjecting the chlorine-containing gas mixture to treatment with silica gel under superatmospheric pressure and thereafter subjecting the silica gel and adsorbed chlorine to subatmospheric pressure to liberate adsorbed chlorine from the silica gel.

In testimony whereof I affix my signature.

JESSE A. GUYER.

In testimony whereof I affix my signature.

MAURICE C. TAYLOR.

CERTIFICATE OF CORRECTION.

Patent No. 1,617,305.  Granted February 8, 1927, to

JESSE A. GUYER ET AL.

It is hereby certified that error appears in the printed specification of the above numbered patent requiring correction as follows: Page 3, line 95, before the numeral "16" insert a decimal point making it read ".16"; and that the said Letters Patent should be read with this correction therein that the same may conform to the record of the case in the Patent Office.

Signed and sealed this 10th day of May. A. D. 1927.

Seal.

M. J. Moore,
Acting Commissioner of Patents.

CERTIFICATE OF CORRECTION.

Patent No. 1,617,305.  Granted February 8, 1927, to

JESSE A. GUYER ET AL.

It is hereby certified that error appears in the printed specification of the above numbered patent requiring correction as follows: Page 3, line 95, before the numeral "16" insert a decimal point making it read ".16"; and that the said Letters Patent should be read with this correction therein that the same may conform to the record of the case in the Patent Office.

Signed and sealed this 10th day of May. A. D. 1927.

Seal.

M. J. Moore,
Acting Commissioner of Patents.